Figure 1:
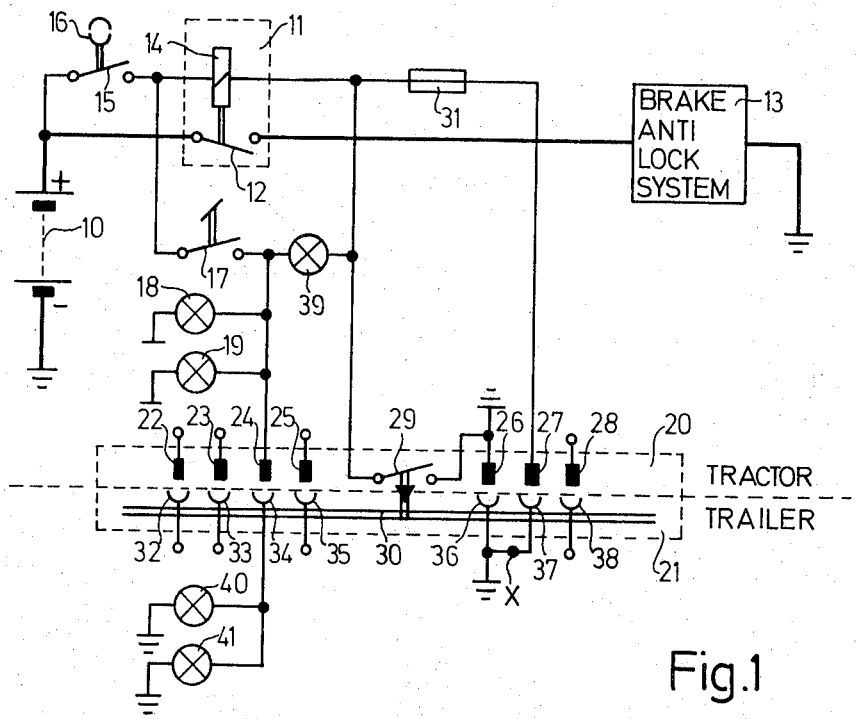

ial System for Wheel Brake Antilock-Equipped Tractors

United States Patent
Bernhardt et al.

[11] 3,822,920
[45] July 9, 1974

[54] TRACTOR-TRAILER ELECTRICAL CONNECTION SYSTEM FOR WHEEL BRAKE ANTILOCK-EQUIPPED TRACTORS

[75] Inventors: Walter Bernhardt, Fellbach; Willy Paule, Stuttgart, both of Germany

[73] Assignee: Robert Bosch GmbH, Stuttgart, Germany

[22] Filed: Aug. 14, 1973

[21] Appl. No.: 388,098

[30] Foreign Application Priority Data
Sept. 11, 1972  Germany............................ 2244511

[52] U.S. Cl..................... 303/20, 188/3 R, 303/7, 303/21 R, 317/17, 340/52 B, 303/1;7;20;21
[51] Int. Cl............................................... B60t 8/00
[58] Field of Search ...... 188/3 R, 112, 181; 317/17, 317/60 R; 340/52 R, 52 B

[56] References Cited
UNITED STATES PATENTS

| | | | |
|---|---|---|---|
| 2,867,294 | 1/1959 | Sturdivant.......................... | 188/3 R |
| 3,053,348 | 9/1962 | Stair................................... | 188/112 |
| 3,062,326 | 11/1962 | Jones et al. ......................... | 188/3 R |
| 3,486,799 | 12/1969 | Greentree....................... | 188/3 R X |
| 3,767,270 | 10/1973 | Urban................................. | 303/7 X |

*Primary Examiner*—Trygve M. Blix
*Assistant Examiner*—Stephen G. Kunin
*Attorney, Agent, or Firm*—Flynn & Frishauf

[57]  ABSTRACT

To automatically disable the tractor brake antilock system if a trailer is connected thereto which does not have an antilock system (but leaving the antilock system intact if the tractor operates separately, or with a brake antilock-equipped trailer), a control relay is provided which is energized through a connection in the separable tractor-trailer electrical system connector, the connector including in the trailer portion thereof a separate terminal which is either grounded, or not, depending upon whether the trailer is equipped with an antilock system or not; if the trailer is equipped with an antilock system, a ground connection is established to the relay, through the trailer connector, to energize the relay. If the trailer is not so equipped, the ground connection is broken and the relay remains de-energized. To permit energization of the relay if the tractor is operated independently, either a normally closed switch is included in the connector which is opened when the connector is engaged, or a normally closed relay is provided on the tractor, which is energized by current flow to the trailer, for example upon operation of the brake lights thereof.

11 Claims, 2 Drawing Figures

TRACTOR-TRAILER ELECTRICAL CONNECTION SYSTEM FOR WHEEL BRAKE ANTILOCK-EQUIPPED TRACTORS

CROSS-REFERENCE TO RELATED APPLICATIONS

U.S. Ser. No. 288,791, Sept. 13, 1972; U.S. Ser. No. 325,569, Jan. 22, 1973; U.S. Ser. No. 328,047, Jan. 30, 1973; U.S. Ser. No. 330,674, Feb. 8, 1973.

The present invention relates to an electrical connection system for tractor-trailer combinations in which the tractor is equipped with a wheel brake antilock system, the electrical connection system automatically disabling the wheel brake antilock system of the tractor if the trailer is not so equipped, but permitting operation of the wheel brake antilock system if, either, the tractor is operating without a trailer, or the trailer is so equipped.

The installation of wheel brake antilock systems is spreading to commercial vehicles, trucks, and the like, as well as to trailers, in order to reduce the danger of skidding upon sharp braking, even if the road should be smooth or slick. Tractors which are to pull trailers, as well as trucks equipped to pull trailers may be equipped with such vehicle brake antilock systems. Before the use of wheel brake antilock systems becomes universal, the situation may arise that a tractor, or a truck equipped with a wheel brake antilock system has a trailer attached thereto which does not have a wheel brake antilock system. In order to prevent differential braking of the tractor and the trailer, it is then necessary to disable the antilock system of the trailer.

If it is overlooked to disable the antilock system of the trailer then dangerous situations may arise if emergency braking is initiated by the operator of the tractor. The tractor will, automatically, have the braking pressure controlled for optimum braking effort, and optimum wheel slippage. This prevents locking of the tractor wheels. If, however, upon sharp braking the wheels of the trailer will lock anyway, the trailer will skid, since its wheels transmit a lower braking force, on the road, and their lateral guidance with respect to the road, that is, the attitude of the vehicle, becomes practically uncontrollable. The lateral guidance of the wheels of the trailer with respect to the road surface is comparatively small. It is an object of the present invention to provide a system in which the wheel antilock system of the tractor is necessarily disabled if a trailer is connected thereto which does not have a wheel antilock system, but which permits full utilization of the wheel brake antilock system if the tractor is operated by itself, or if it is connected to a trailer, or to trailers, which are all equipped with brake antilock systems.

SUBJECT MATTER OF THE PRESENT INVENTION

Briefly, a control relay is provided which has a winding which is connected on the one hand with the vehicle battery and, further, to a control contact in the separable cable connector between tractor and trailer. The matching control contact in the trailer is connectible with ground, or chassis, forming the return line to the battery of the tractor-trailer combination.

As used herein, the "ground" or "chassis" connection is to be taken as the return line to the vehicle battery, as customary in automotive applications. Also, if more than one trailer is to be connected, the vehicle which is in pulling relation is to be deemed the tractor, although it, itself, may form the trailer of a connected tractor.

The connection status of the tractor brake wheel antilock system is thus controlled by merely connecting or disconnecting the cable connection between tractor and trailer, which is provided in any event. It is then only necessary to distinguish in the connection units which are associated with trailers which have, or do not have, respectively, wheel antilock systems of their own.

In accordance with a feature of the invention, trailers which have their own wheel antilock system include in the connector a ground or chassis connection to the control contact forming the antilock system control contact on the tractor portion of the connector. This ground or chassis connection is omitted in trailers which do not an antilock system. The control relay therefore will respond only when the ground connection is present; only then will the wheel brake antilock system in the tractor be enabled.

Figure 2:
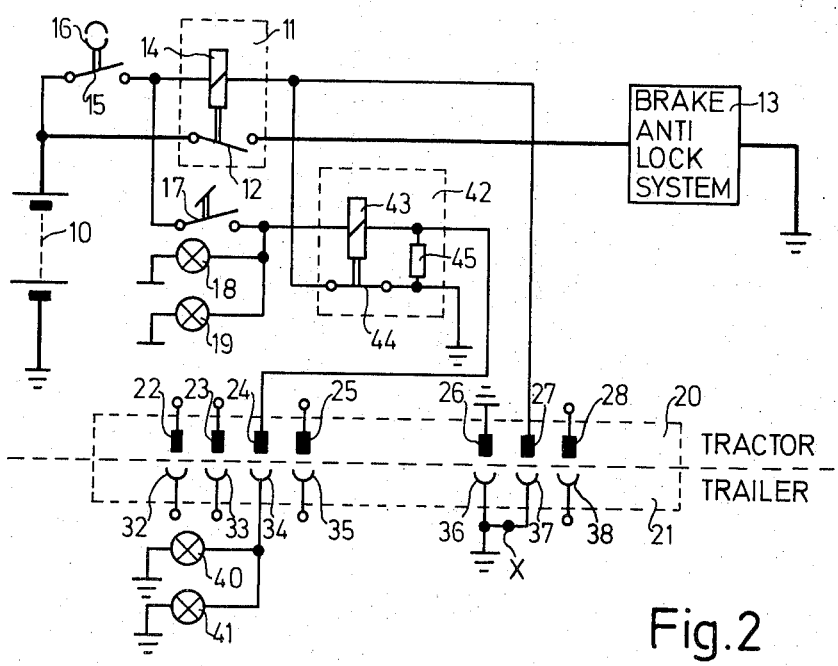

The invention will be described by way of example with reference to the accompanying drawings, wherein:

FIGS. 1 and 2 both illustrate, schematically, circuit diagrams showing two embodiments of automatic connection and control systems.

A battery 10 located on the tractor supplies electrical power to the entire tractor-trailer train. The positive terminal 10 is connected to a relay 11, which has a winding 14 and a contact terminal 12. Contact terminal 12 connects the battery 10 to a wheel brake antilock system 13, which may be of known construction (see the aforementioned cross-reference applications). The antilock system 13 is grounded at its other terminal. Winding 14 of relay 11 is connectible to the battery over the ignition switch 15. Switch 15 is closed, when the symbolically indicated key 16 is turned.

The junction between ignition switch 15 and winding 14 is connected to the brake light switch 17. The other terminal of brake light switch 17 is connected over parallel connected brake lights 18, 19 and then to chassis. The tractor is furnished with a supply cable which has a separable plug-socket connection to a cable supplying electrical power to the trailer. The plug-socket connection has two parts, part 20 associated with the tractor and having contacts 22–28; part 21 is associated with the trailer and has matching fitting connecting contacts 32–38. The connections are preferably pin- and sleeve-connections or the like.

Winding 14 of relay 11 which is connected to the ignition switch on one terminal, is further connected over a fuse 31 to terminal 27 of the tractor connector 20. Additionally, it is connected over a switch 29 to chassis terminal 26, which is grounded on the tractor. Switch 29 is located in the connecting unit 20, 21 itself and may, for example, be a push button switch which, in normal condition, is closed but, when depressed, will open. In the example of FIG. 1, the switch 29 is operated by an operating button which lifts, or opens the switch contact 29 when the connector elements 20, 21 are connected together. Switch operation, which may be effected by the housing, or closing elements, schematically indicated at 30, thus is opened when the tractor-trailer cable connector is connected.

A control lamp 39 is connected between the brake lights 18, 19 and switch 29. Brake lights 18, 19 are further connected to a brake light terminal 24 on the connector element 20. Contact 24 is engaged by contact 34 in the trailer connector 21, to connect brake lights 40, 41 on the trailer to ground.

The tractor and trailer both have a common chassis or ground connection, formed by terminals 26, 36, so that the return line to the power supply 10 is electrically complete and reliable. Contact 26 is associated with the tractor connector 20, contact 36 with the trailer connector 21. Contact 27, which is connected through fuse 31 to the winding 14 of relay 11 is engageable with contact 37 in the trailer unit 21.

Trailers which are not equipped with vehicle wheel antilock systems will have contact 37 blank, that is, contact 37 will have no connection in the electrical system of the trailer, and the lead from contact 37 is cut at point X. Trailers which are equipped with vehicle wheel antilock systems, however, have the contact 37 connected to contact 36, and hence to chassis or ground of the electrical system of the tractor-trailer combination. FIG. 1 illustrates the case in which the trailer is equipped with a wheel antilock system.

Operation

The antilock system 13 of the tractor is enabled, that is, supplied with current when switch 12 closes, which is effected by energization of winding 14 of relay 11. This requires a ground or chassis connection to the relay. This chassis connection can be obtained in two ways: over the control switch 29, or over terminals 27, 37. Three modes of operations have to be distinguished:

1. tractor operation without a trailer: the connector 20, 21 is not engaged, so that connector 20 will be free. Switch 29 is not operated, since connector 21 is not engaged in the connector element 20. The wheel brake antilock system will be effective; current path to relay 14: battery 10, ignition switch 15, relay 14, closed switch 29, and ground. Relay 14 will pull in, closing switch 12, supplying current to the brake antilock system 13.

2. tractor and trailer without wheel antilock system: upon connection of the parts 20, 21 of the connector, switch 29 is opened. The terminal 37 in connector 21 is clipped at point X. Current path for relay winding 14: battery 10, ignition switch 15, winding 14, to switch 29 (open); or through fuse 31, terminal 27, 37, open at X. As can be seen, winding 14 is isolated from ground, the relay 11 will not pull in and the antilock system 13 will not receive current, that is, the system is disabled.

3. tractor and trailer with wheel antilock system: the connector 20, 21 is engaged, and the connection between terminals 37 and 36 is established, that is, is not disconnected at point X. Current path through relay 14: battery 10, ignition switch 15, relay 14, fuse 31, terminals 27, 37 to chassis terminals 36, 26. Switch 29 is open, but the current path is established through the parallel circuit over fuse 31, and terminals 27, 37, 36, 26. The relay 11 now can pull in, closing switch 12 and enabling the antilock system 13.

Fuse 31 is provided as the protection for the control circuit in case terminal 37 should be misconnected in the tractor and connected to another terminal at positive voltage. The indicator lamp 39 is an indication to the driver than the antilock system 13 operates. If ground connection for winding 14 is present, and thus the antilock system 13 is engaged, current will flow over brake light switch 17 through lamp 39 to ground; thus, lamp 39 indicates that the antilock system is operating; it remains extinguished if the ground connection to lamp 39 is disabled, and the antilock system 13 is not operating.

FIG. 2 illustrates a modification which, basically, is similar to the system of FIG. 1 and similar elements have been given the same reference numerals and will not be described again. Contrary to FIG. 1, however, the brake light switch 17 is not connected directly to terminal 24 of the connector 20, 21 but rather over a winding 43 of a relay 42. Terminal 24, as before, supplies current to the brake lights 40, 41 of the trailer. Winding 43 of relay 42 operates a normally closed switch which is connected between winding 14 and ground. Terminal 24 is further connected over a compensating resistor 45 to chassis. The connector-operated switch 29 is not used.

Operation 1a. tractor, without trailer: winding 43 of relay 42 is not energized since the connector 20, 21 is open and terminal 24 is blank. NC contact 44 remains closed and connects winding 14 of relay 11 to ground. Switch 12 will pull in, and the antilock system will be operative.

2a. tractor and trailer without brake antilock system: the connection between terminals 37 and 36 is broken at X. Under driving operation, and without operating the brake pedal, relay 14 will be pulled in, that is, energized as before over the NC contact 44 of relay 43. As soon as the brake is operated, that is, as soon as switch 17 is closed, winding 43 is energized (since current will flow to the brake lights 40, 41 of the trailer), thus pulling in relay 43 which will open the switch connection 44. Ground connection for the winding 14 of relay 11 is interrupted and the antilock system is disabled. The compensating resistance 45 is provided to match the current through winding 43 to the lamps 40, 41 used in the trailer.

3a. tractor and trailer having its own wheel antilock system: the connection at X is established; switch 44 will open, as before, as soon as brake switch 17 is operated. Switch 44 is, however, shunted by the line through terminals 27, 37, connection at X, and terminals 36, 26. Winding 14 will pull in switch 12 and the antilock system will operate.

Terminals 22, 23, 25, 28, not further described, are used to supply current to other elements in the trailer, such as direction signals, stop lights, position lights and the like. Any number of additional terminals may be provided. The type of connector 20, 21 can be standard, or selected in accordance with design or operating requirements; two of customary standard connectors may be used; such standard connectors usually provide seven terminals, although other connectors are customary, for example connectors which have up to 15 terminals to supply power for additional apparatus, cooling equipment, etc. The circuit in accordance with either of the embodiments of FIG. 1 or 2 may be used with any desired connector.

The embodiment of FIG. 1 is particularly simple, but requires some modification of the connector 20, since the additional switch 29 must be fitted thereto, in such a manner that it will be opened when the connector 21 is engaged. The second embodiment of FIG. 2 does not require any modification of the connector, as such, but requires an additional relay 42. Both solutions to the problem require approximately the same amount of additional materials and costs; they are the equivalent as far as the solution is concerned, in that both effectively disable the wheel antilock system of a tractor if a trailer is connected which does not have a wheel antilock system, but permits normal functioning of the wheel brake antilock system is no trailer is connected, or if the trailer has its own system.

Various changes and modifications may be made within the scope of the inventive concept.

We claim:

1. Tractor-trailer electrical connection system, in which the tractor is equipped with a source of electrical power supply (10) and a wheel brake antilock system (13) and separable plug and socket connection means (20, 21) are provided, electrically connecting the tractor to the trailer, one connection means (20) being connected to the electrical system of the tractor and the other connection means (21) being connected to the electrical system of the trailer, the improvement wherein means are provided to automatically disable the tractor brake antilock system (13) if the trailer is not equipped with a brake antilock system, comprising a control relay (11) having a winding (14), and controlling connection of the brake antilock system (13) of the tractor to the power supply (10);

engageable control plug and socket contacts (27, 37), on the separable connection means (20, 21) and means connecting the winding (14) in circuit with the power supply (10) and the tractor control contact (27), the trailer control contact (37) being selectively connectible (X) to the power supply ground, or return connection (26, 36), or remaining unconnected, to control operation of the relay (11) in accordance with the connection of the trailer control contact (37), said trailer control contact connection being effected in accordance with the presence or absence of a wheel brake antilock system in the trailer.

2. System according to claim 1 in which the trailer is equipped with a brake antilock system, wherein the trailer control connection (37) is connected to the power supply return connection (37-X-36-26).

3. System according to claim 1 further comprising a control switch (29) connected to the winding (14) of the relay (11), said control switch being connected to the return or ground line of the power supply, and being operated to open when the tractor connection means (20) and the trailer connection means (21) are engaged.

4. System according to claim 3 wherein the control switch (29) is a normally closed switch located on the tractor connection means (20), for operating engagement with the trailer connection means to open the connection of the switch to return line or ground.

5. System according to claim 1 wherein said relay (11) is normally open and, when the winding is energized, effects closing of a switch (12) between the wheel brake antilock system (13) and the power supply (10) to enable the wheel brake antilock system when the relay is energized.

6. System according to claim 5 further comprising switching means (25; 42, 44) connecting the relay winding (14) in a closed circuit between the power supply (10) and the return line or ground, said switching means (29; 42, 44) being opened if the tractor connection means (20) and the trailer connection means (21) are engaged and, further, if the control contact (37) of the trailer connection means is disconnected (X) from the return or ground power line (36, 26), to break a continuous current path through said relay winding, and prevent energization of the wheel brake antilock system upon presence of a trailer not equipped therewith.

7. System according to claim 6 wherein the trailer has brake indicator lights connected to brake plug-and-socket contacts (34, 24);

and said switching means comprises a sensing relay (42) having a sensing winding (43) and sensing switch terminals (44), the sensing winding (43) being connected to the winding (14) of the first relay and in circuit with the brake light terminals (24, 34) so that current flowing through the brake lights of the trailer will energize the sensing relay (42).

8. System according to claim 7 wherein an adjustment resistor (45) is connected to the sensing relay winding (43) and in parallel to the trailer brake lights.

9. System according to claim 1 wherein the tractor is provided with a brake light switch (17) and brake lights (18, 19);

further comprising an indicator lamp (39) connected to the brake light switch (17) and said control switch (29) to indicate operation of the wheel antilock system when either the tractor operates by itself, or with an antilock-equipped trailer.

10. System according to claim 1 further comprising a fuse (31) in circuit between the winding (14) of the relay (11) and the control contact (27).

11. System according to claim 1 wherein an ignition switch (15) is provided in the tractor connected in circuit with the power supply source to enable the system.

* * * * *